(12) United States Patent
Granberg et al.

(10) Patent No.: US 9,863,271 B2
(45) Date of Patent: Jan. 9, 2018

(54) ARRANGEMENT FOR A TURBOMACHINE

(71) Applicant: Siemens Aktiengesellschaft, Munich (DE)

(72) Inventors: Per Granberg, Norsholm (SE); Janos Szijarto, Finspong (SE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 577 days.

(21) Appl. No.: 14/377,888

(22) PCT Filed: Feb. 27, 2013

(86) PCT No.: PCT/EP2013/053898
§ 371 (c)(1),
(2) Date: Aug. 11, 2014

(87) PCT Pub. No.: WO2013/127833
PCT Pub. Date: Sep. 6, 2013

(65) Prior Publication Data
US 2015/0003964 A1 Jan. 1, 2015

(30) Foreign Application Priority Data
Feb. 28, 2012 (EP) ...................................... 12157286

(51) Int. Cl.
*F04D 29/58* (2006.01)
*F01D 25/12* (2006.01)
(Continued)

(52) U.S. Cl.
CPC ............ *F01D 25/12* (2013.01); *B23K 26/388* (2013.01); *B23K 26/389* (2015.10); *F01D 9/04* (2013.01);
(Continued)

(58) Field of Classification Search
CPC ......................................................... F01D 9/04
See application file for complete search history.

(56) References Cited

U.S. PATENT DOCUMENTS 3,300,178 A 1/1967 Keer
6,082,961 A * 7/2000 Anderson ................. F01D 5/08
415/115
(Continued)

FOREIGN PATENT DOCUMENTS

CN 101189411 A 5/2008
EP 0522795 A1 1/1993
(Continued)

OTHER PUBLICATIONS

RU Official Decision to Grant dated Jan. 24, 2017, for RU patent application No. 2014139066.

*Primary Examiner* — Craig Kim
*Assistant Examiner* — Jason Fountain
(74) *Attorney, Agent, or Firm* — Beusse Wolter Sanks & Maire

(57) ABSTRACT

An arrangement for a turbomachine is provided. The arrangement includes a vane for directing a hot gas during the operation of the turbomachine, a stator ring for securing the vane, a heat shield for protecting the stator ring from the hot gas flow wherein the heat shield is arranged in downstream direction of the hot gas flow in front of the stator ring characterized in that the heat shield comprises a plurality of channels formed therein for directing a cooling air.

15 Claims, 4 Drawing Sheets

(51) Int. Cl.
   *F01D 9/04*      (2006.01)
   *F02C 7/24*      (2006.01)
   *B23K 26/388*    (2014.01)
   *F01D 25/14*     (2006.01)
   *B23K 26/382*    (2014.01)

(52) U.S. Cl.
   CPC ............ *F01D 9/041* (2013.01); *F01D 25/14* (2013.01); *F02C 7/24* (2013.01); *F05D 2230/40* (2013.01); *F05D 2240/15* (2013.01); *F05D 2260/202* (2013.01); *F05D 2300/17* (2013.01); *F05D 2300/175* (2013.01); *F05D 2300/177* (2013.01); *Y10T 29/49323* (2015.01)

(56) References Cited

U.S. PATENT DOCUMENTS

| | | | |
|---|---|---|---|
| 7,766,609 B1 * | 8/2010 | Liang | F01D 9/041 |
| | | | 415/138 |
| 8,777,567 B2 * | 7/2014 | Poon | F01D 5/20 |
| | | | 416/92 |
| 2009/0166988 A1 | 7/2009 | Irmisch | |
| 2012/0100008 A1 | 4/2012 | Ahmad | |

FOREIGN PATENT DOCUMENTS

| EP | 0770761 A1 | 5/1997 |
|---|---|---|
| EP | 0522795 A1 | 1/1999 |
| EP | 1731714 A1 | 12/2006 |
| EP | 1741877 A1 | 1/2007 |
| EP | 2282014 A1 | 2/2011 |
| RU | 2316662 C1 | 2/2008 |
| RU | 101087 U1 | 1/2011 |

\* cited by examiner

US 9,863,271 B2

ARRANGEMENT FOR A TURBOMACHINE

CROSS REFERENCE TO RELATED APPLICATIONS

This application is the US National Stage of International Application No. PCT/EP2013/053898 filed Feb. 27, 2013, and claims the benefit thereof. The International Application claims the benefit of European Application No. EP12157286 filed Feb. 28, 2012. All of the applications are incorporated by reference herein in their entirety.

FIELD OF INVENTION

The present invention relates to an arrangement for a turbomachine.

BACKGROUND OF INVENTION

In modern day turbomachines various components of the turbomachine operate at very high temperatures. These components include the blade or vane component, which are in shape of an airfoil. In the present application, only "vane", but the specifications can be transferred to a blade. The high temperatures during operation of the turbomachine may damage the vane component, hence cooling of the vane component is important. Cooling of these components is generally achieved by passing a cooling fluid that may include air from a compressor of the turbomachine through a core passage way cast into the vane component.

The vanes which are typically stator vanes are fixed to the stator ring, which are themselves secured to a casing. These vanes are often assembled in segments in a front stage of the turbomachine and may be shrouded at the inner ends to minimize the vibrational effect of flow variations. These vanes are locked in such a manner which will prevent the vanes from rotating around the casing.

The vanes as well as the stator rings are subjected to hot gas flow which may cause damage to these components. Although the vanes are cooled by passing cooling air through the passageway cast into them, this cooling is not sufficient. In addition stator rings are not protected from the hot gas flow causing damage to the stator ring.

EP 1731714 relates to a gap blocking device for a flow-restricting channel wall, and using such a gap blocking device for improving an efficiency and combustion stability and for increasing the lifetime of a duct wall.

EP 1741877 relates to a housing having a wall flow structure and the wall flow structure is surrounded by a flow path. A flow is directed in the flow path, and the wall structure is arranged on a heat shield.

U.S. Pat. No. 6,082,961 relates to a platform cooling system having a guide-blade platform. The cooling is achieved by a row of cooling bores provided in a combustion-chamber segment, and provides cooling air to a gap between the combustion-chamber segment and the guide-blade platform.

U.S. Pat. No. 3,300,178 A teaches a cooling arrangement, wherein a sheet-metal shield is spaced a small distance away from face of the end ring, and cooling air may be fed into the intermediate space.

U.S. Pat. No. 7,766,609 B1 teaches a turbine vane with a heat shield on the shroud having channels between the heat shield and the wall of the vane

SUMMARY OF INVENTION

It is therefore an object of the present invention to protect the stator ring from the hot gas flow and to provide an effective cooling to the vane.

This object is achieved by providing an arrangement for the turbomachine according to the claims.

According to aspects of the invention an arrangement for turbomachine includes a vane for directing a hot gas during the operation of the turbomachine, a stator ring for securing the vane, a heat shield for protecting the stator ring from the hot gas flow wherein the heat shield is arranged in downstream direction of the hot gas flow in front of the stator ring characterized in that the heat shield comprises a plurality of channels formed therein for directing a cooling air. The channels are arranged such that the cooling air is released into a hot gas flow path of the hot gas flow.

By having the heat shield in the downstream direction of the hot gas flow in front of the stator ring the ring is protected. Additionally, the plurality of channels in the heat shield direct a cooling air with high pressure to the vane provides an effective cooling arrangement.

In one embodiment, the plurality of channels are configured to direct the cooling air into the hot gas flow path. The channels increase cooling effectiveness by providing the air with high pressure.

In one embodiment, the vane includes an airfoil portion and a root portion wherein the root portion is mounted on the stator ring. The stator ring secures the vane thus preventing the movement of the vane during operation of the turbomachine.

In another embodiment, the vane includes a head portion is located at an opposite end to the root portion, the head portion is attached to a second stator ring.

In one embodiment, the heat shield is attached to the second stator ring to protect it from the hot gas flow.

In another embodiment, the heat shield is annular in shape coupled to the stator ring. The heat shield thus covers the stator ring and protects from the hot gas flow.

In one embodiment, the plurality of channels in the heat shield are formed using a laser sintering technique. Laser sintering technique provides an efficient way of forming a desired three dimensional shape with channels to ensure cooling effectiveness.

The above-mentioned and other features of the invention will now be addressed with reference to the accompanying drawings of the present invention. The illustrated embodiments are intended to illustrate, but not limit the invention. The drawings contain the following figures, in which like numbers refer to like parts, throughout the description and drawings

DETAILED DESCRIPTION OF INVENTION

Embodiments of the present invention relate to an arrangement for a turbomachine. The turbomachine may include a gas turbine, a steam turbine, a turbofan and the like.

Figure 1:
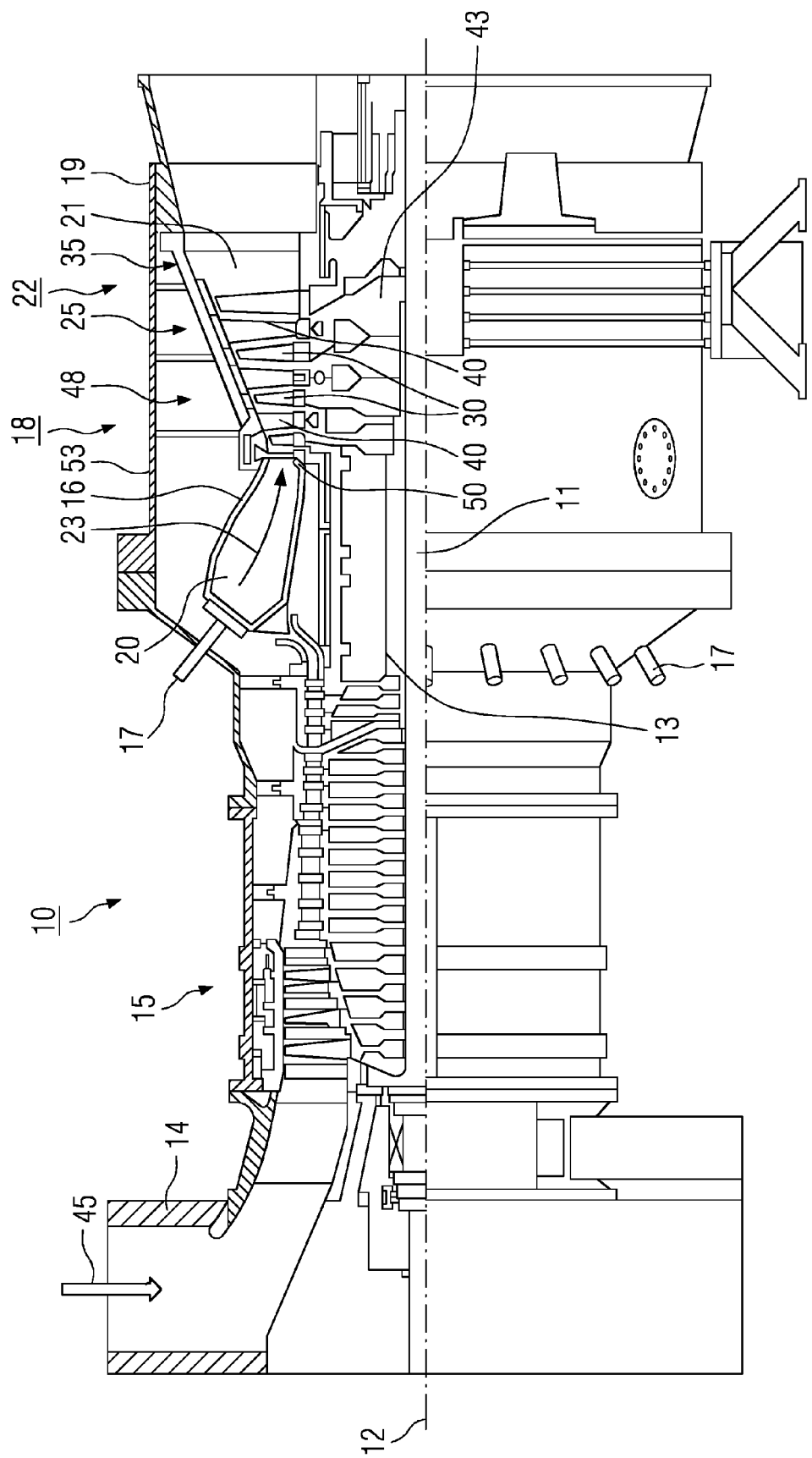
FIG. 1 is a schematic diagram of a gas turbine.

FIG. 1 is a schematic diagram of a turbomachine, such as a gas turbine 10 depicting internal components. The gas turbine 10 includes a rotor 13 which is mounted such that it can rotate along an axis of rotation 12, has a shaft 11 and is also referred to as a turbine rotor.

The gas turbine 10 includes an intake housing 14, a compressor 15, an annular combustion chamber 20 with a plurality of coaxially arranged burners 17; a turbine 18 and exhaust-gas housing 19 follow one another along the rotor 13.

The annular combustion chamber 20 is in communication with an annular hot-gas passage 21, where, by way of example, four successive turbine stages 22 form the turbine 18.

It may be noted that each turbine stage 22 is formed, for example, from two blade or vane rings. As seen in the direction of flow of a working medium 23, in the hot gas passage 21 a row of guide vanes 25 is followed by a row 35 formed from rotor blades 30. The guide vanes 40 are secured to an inner housing 48 of a stator 53, whereas the rotor blades 30 of the row 35 are fitted to the rotor 13 for example by means of a turbine disk 43.

A generator not shown in FIG. 1 is coupled to the rotor 13. During the operation of the gas turbine 10, the compressor 15 sucks in air 45 through the intake housing 14 and compresses it. The compressed air provided at the turbine-side end of the compressor 15 is passed to the burners 17, where it is mixed with a fuel. The mix is then burnt in the combustion chamber 20, forming the working medium 23. From there, the working medium 23 flows along the hot-gas passage 21 past the guide vanes 40 and the rotor blades 30. The working medium 23 is expanded at the rotor blades 30, transferring its momentum, so that the rotor blades 30 drive the rotor 13 and the latter in turn drives the generator coupled to it.

In addition, while the gas turbine 10 is in operation, the components which are exposed to the hot working medium 23 are subjected to thermal stresses. The guide vanes 40 and the rotor blades 30 of the first turbine stage 22, as seen in the direction of flow of the working medium 23, together with the heat shield bricks which line the annular combustion chamber 20, are subject to the highest thermal stresses. These components are typically cooled by a coolant, such as oil.

As will be appreciated, the components of the gas turbine 10 are made from a material such as superalloys which are iron-based, nickel-based or cobalt-based. More particularly, the turbine vane or blade 40, 30 and components of the combustion chamber 20 are made from the superalloys mentioned hereinabove.

Figure 2:
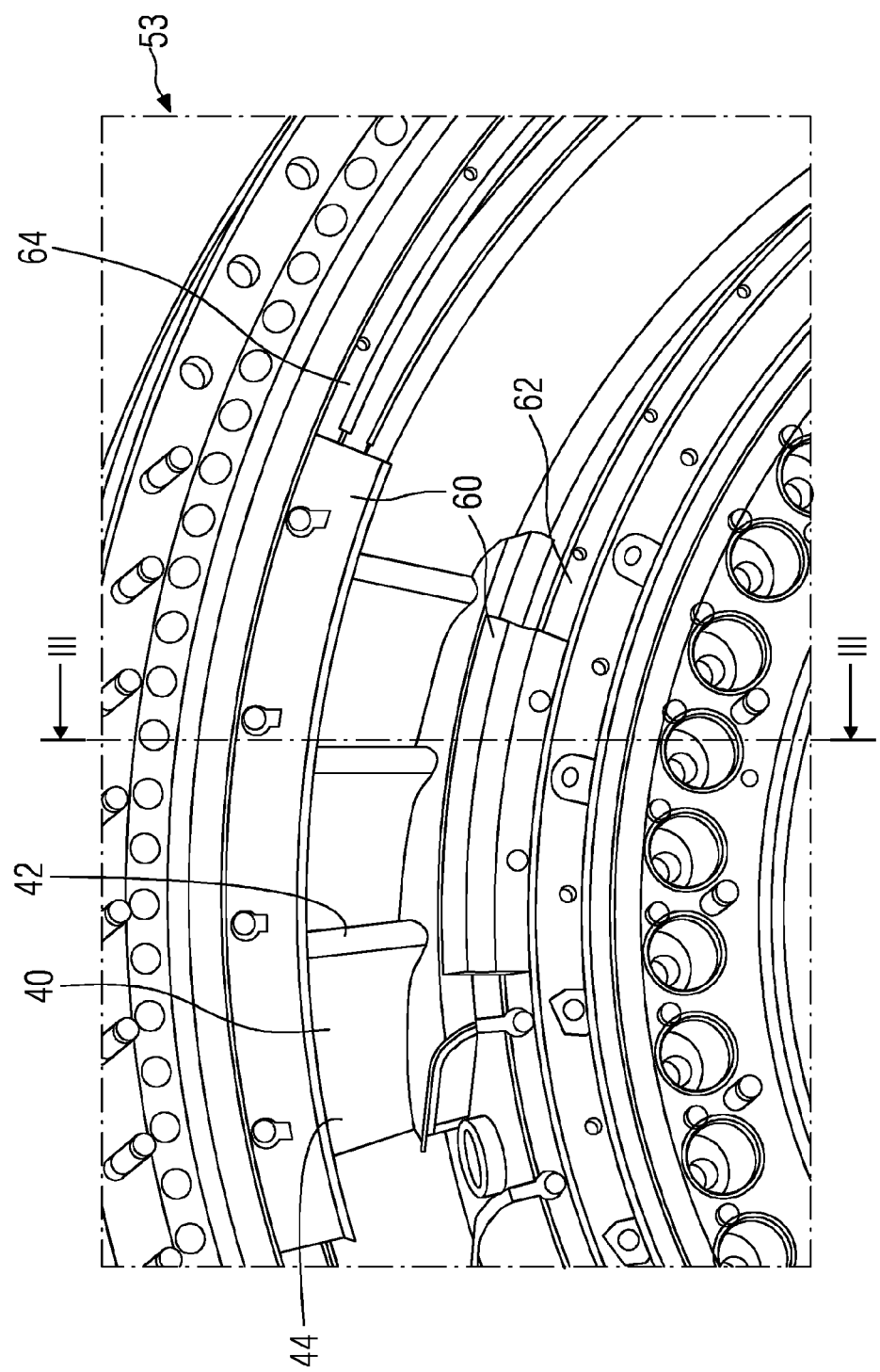
FIG. 2 is a partial view of a stator of the gas turbine of FIG. 1.

Referring now to FIG. 2, a partial view of a stator, such as the stator 53 of the gas turbine 10 is depicted. The stator 53 includes a first stator ring 62 which may also be referred to as an inner stator ring and a second stator ring 64 which may be referred to as an outer stator ring with guide vanes 40 extending between them.

As will be appreciated the guide vane includes an airfoil portion extending in a direction radial to the axis of rotation 12 of the rotor 13 of the turbomachine, and a root portion for fixing the vane 40 into the stator 53. More particularly, the root portion of the guide vane 40 is mounted on the stator ring 62. These guide vanes 40 are mounted on the first stator ring 62 in a circular series. Additionally, the guide vane 40 also includes a head portion opposite the root portion which is fixed to the second stator ring 64. The second stator ring 64 defines the axial position of the vane within the turbomachine. The stator rings prevent the movement of the vane in a direction axial relative to the stator ring.

It may be noted that the first stator ring 62 and the second stator ring 64 are arranged circumferentially with respect to the rotor 13 of the turbomachine, the second stator ring 64 is placed outwardly from the first stator ring 62 along a radial direction from the axis of rotation 12 of the rotor 13 of the turbomachine.

The stator includes a heat shield 60 for protecting the stator ring 62 from the hot gas flow wherein the heat shield 60 is arranged in downstream direction of the hot gas flow that is, in front of the stator ring 62. As will be appreciated the hot gas flow path is in the direction from a leading edge 42 towards a trailing edge 44 of the vane 40. More particularly, the hot gas flow as depicted in FIG. 2 is into the drawing. It may be noted that the heat shield 60 may be attached to the first stator ring 62 through brazing, welding or by any other means known in the art.

The heat shield 60 includes a plurality of channels 86 formed therein for directing a cooling air from a main air supply of the turbine for effective cooling of the vane 40. The channels 86 may be formed from techniques such as but not limited to laser sintering technique.

Additionally, the second stator ring 64 also has the heat shield coupled to it so as to protect the second stator 64 ring from the hot gas flow.

In accordance with aspects of the present technique, the heat shield 60 is annular in shape arranged coaxially with respect to the stator ring 62.

Figure 3:
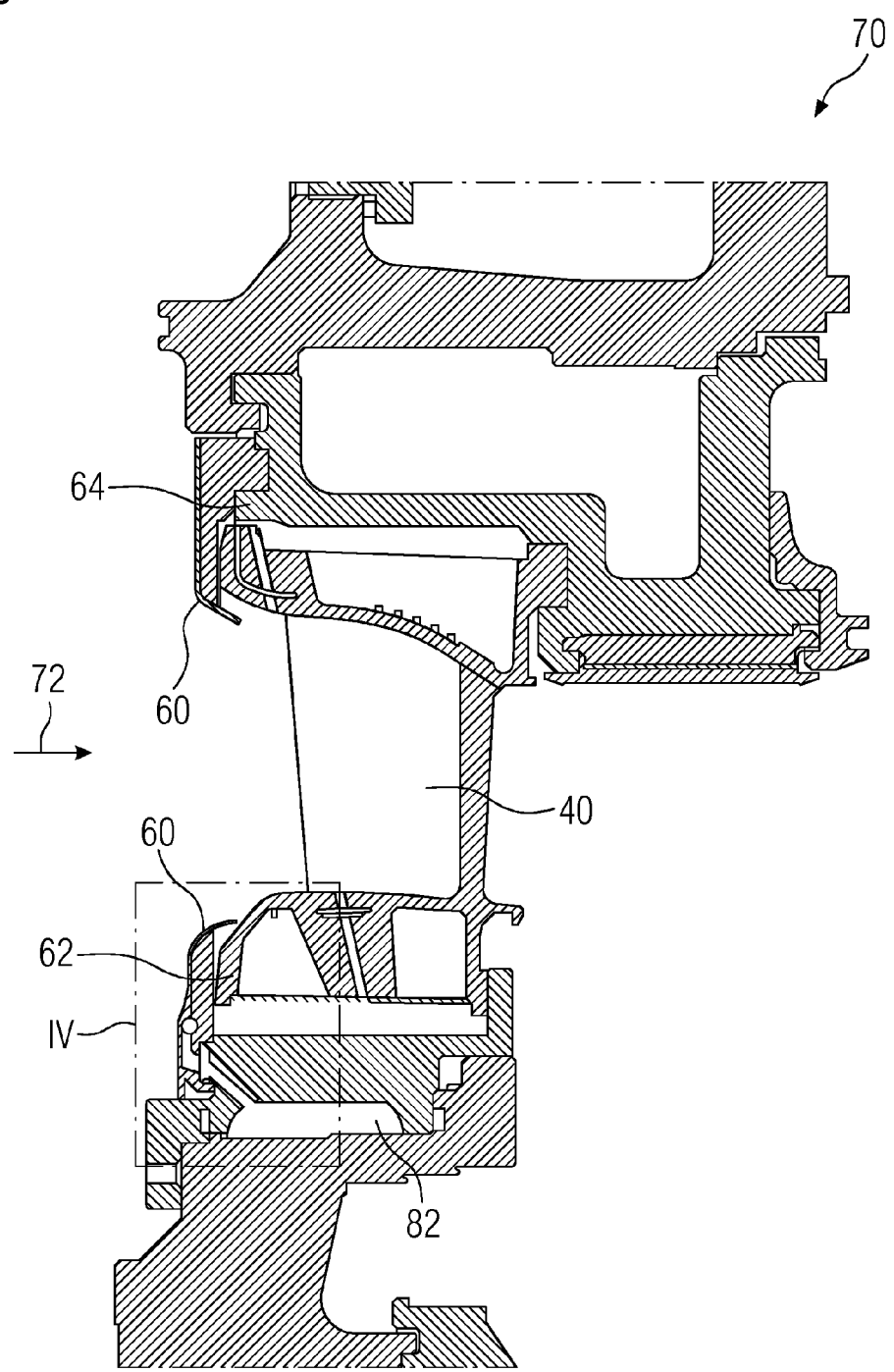
FIG. 3 is a sectional view of the stator along the lines III-III including a heat shield.

FIG. 3 is sectional view 70 of the stator 53 of FIG. 2 along the lines III-III. The vane 40 is depicted as extending between the first stator ring 62 and the second stator ring 64. The exemplary heat shield 60 is depicted as attached to the first stator ring 62 and to the second stator ring 64 to protect the stator rings 62, 64 from the hot gas flow which is in the downstream direction. The hot gas flow is indicated by a reference numeral 72.

As previously noted, the heat shield 60 includes a plurality of channels for directing a cooling air. Reference numeral 82 is indicative of a portion from which the air is supplied to cool the vane 40. As will be appreciated, the cooling air is directed into the vane 40 through a passageway cast into the vane.

In accordance with aspects of the present technique the cooling air is directed into the channels within the heat shield 60 and thereafter released into the hot gas flow path 72. Reference numeral IV is indicative of the portion depicting the arrangement of the heat shield in the stator 53 of the turbomachine 10.

Figure 4:
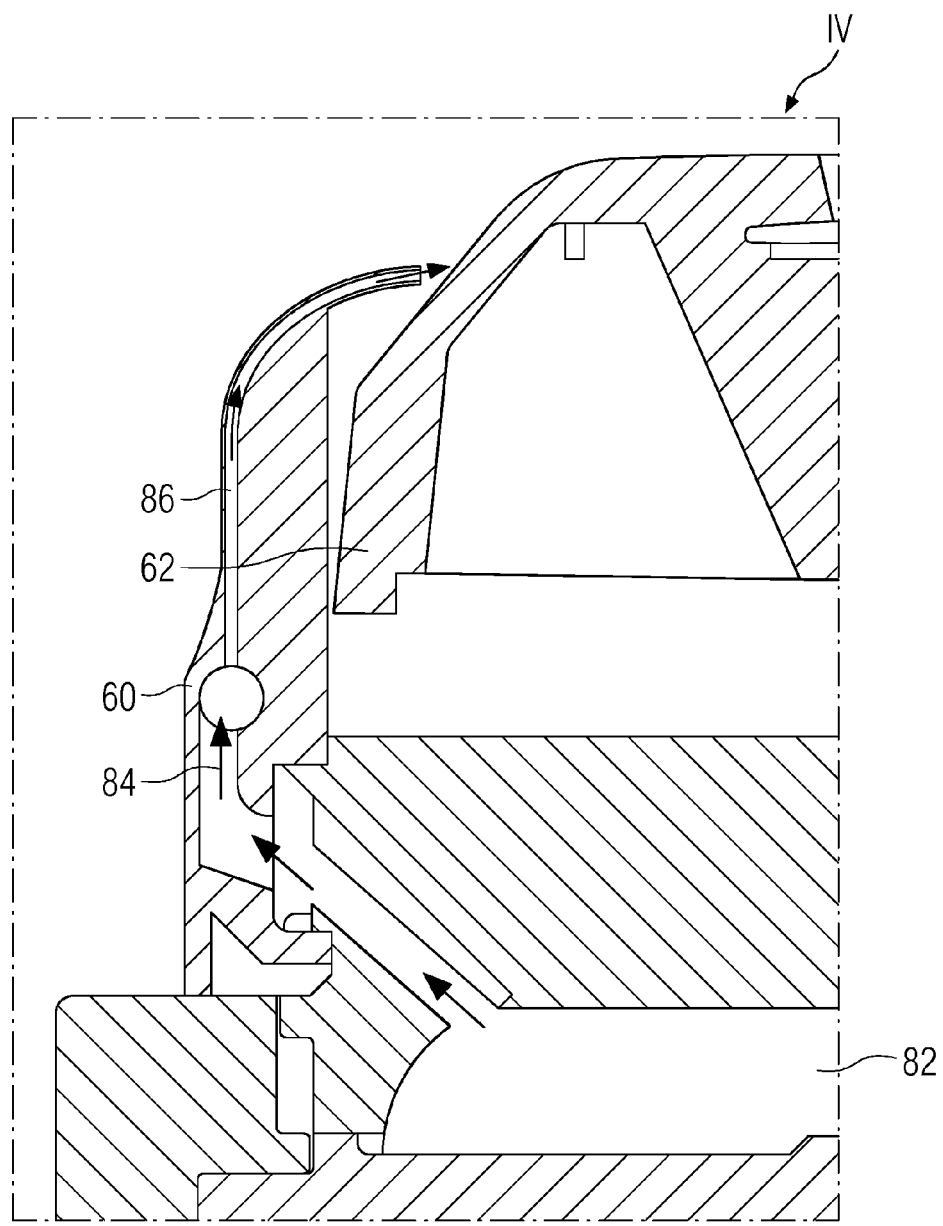
FIG. 4 is a schematic diagram depicting an exploded view of a portion of stator with the heat shield, in accordance with aspects of the present technique.

Turning now to FIG. 4 an exploded view of the portion IV of the stator as in FIG. 3 is depicted. The heat shield 60 includes a plurality of channels such as the channel 86 for directing a cooling air 84 into the hot gas flow path. The cooling air 84 is directed from the main air supply region 82.

The cooling air 84 from the channels 86 also cools the vane 40 due to high pressure which increases cooling effectiveness.

The invention claimed is:

1. An arrangement for a turbomachine comprising,
a vane for directing a hot gas flow during operation of the turbomachine,
a stator ring for securing the vane, and
a heat shield for protecting the stator ring from the hot gas flow, wherein the heat shield is arranged in front of the stator ring with respect to a direction of flow of the hot gas flow,
wherein the heat shield comprises channels formed therein for directing a cooling air, the channels oriented transverse to the hot gas flow and each comprising an inlet disposed on a downstream side of the heat shield with respect to the hot gas flow and an outlet, wherein the inlet is disposed relatively farther from the hot gas flow than the outlet such that the cooling air travels radially then is released into a hot gas flow path of the hot gas flow, wherein the heat shield terminates at a radially inward end with respect to the hot gas flow, wherein the radially inward end is located upstream of the vane, and wherein the outlet is disposed through the radially inward end.

2. The arrangement for the turbomachine according to claim 1,
wherein the cooling air from the channels in the heat shield is directed directly into the hot gas flow path.

3. The arrangement for the turbomachine according to claim 1,
wherein the vane comprises an airfoil portion extending in a direction radial to an axis of rotation of a rotor of the turbomachine, and a root portion mounted on the stator ring.

4. The arrangement for the turbomachine according to claim 3, further comprising
a second stator ring for fixing a head portion of the vane, wherein the head portion of the vane is at an opposing end of the root portion.

5. The arrangement for the turbomachine according to claim 4,
wherein the second stator ring is located in a radially outward direction from the stator ring with respect to the axis of rotation of the rotor of the turbomachine.

6. The arrangement for the turbomachine according to claim 4,
wherein the second stator ring is protected from the hot gas flow by the heat shield.

7. The arrangement for the turbomachine according to claim 4,
wherein the first and second stator rings prevent move-movement of the vane in an axial direction relative to the stator rings.

8. The arrangement for the turbomachine according to claim 1,
wherein the heat shield is annular in shape and coupled directly to the stator ring.

9. A method of forming the heat shield of the arrangement for the turbomachine according to claim 1, comprising:
forming the channels in the heat shield using laser sintering technique.

10. The arrangement for the turbomachine according to claim 1, the vane further comprising a platform, wherein the heat shield is disposed in front of both the stator ring and the platform.

11. The arrangement for the turbomachine according to claim 10, wherein the heat shield comprises an opening configured to receive the cooling air from an air supply disposed in the stator ring.

12. The arrangement for the turbomachine according to claim 1, wherein the channels are configured to guide the cooling air radially toward the hot gas flow and then axially along the hot gas flow.

13. An arrangement for a turbomachine comprising,
a stator vane,
a stator ring configured to secure the stator vane in position, and
a heat shield arranged in front of the stator ring with respect to a direction of flow of
a hot gas flow during operation,
wherein the heat shield comprises channels formed therein for directing a cooling air, each channel comprising an inlet, an outlet, and a passageway therebetween, wherein a perimeter of the passageway is fully defined by the heat shield, and wherein the channels are configured to guide the cooling air radially toward the hot gas flow and then axially along the hot gas flow before releasing the cooling air into the hot gas flow.

14. An arrangement for a turbomachine comprising,
a stator vane,
a stator ring configured to secure the stator vane in position, and
a heat shield coupled directly to the stator ring and arranged in front of the stator ring with respect to a direction of flow of a hot gas flow during operation,
wherein the heat shield comprises channels formed therein for directing a cooling air radially into the hot gas flow, and wherein the heat shield terminates at a radially inward end with respect to the hot gas flow, wherein the radially inward end is located upstream of the airfoil portion, and wherein the outlet is disposed through the radially inward end.

15. The arrangement of claim 14, wherein the heat shield comprises an opening disposed on a downstream side of the heat shield that is configured to receive the cooling air from an air supply disposed in the stator ring.

* * * * *